(12) United States Patent
Seo

(10) Patent No.: US 9,726,918 B2
(45) Date of Patent: Aug. 8, 2017

(54) LIQUID CRYSTAL DISPLAY DEVICE

(71) Applicant: Samsung Display Co., Ltd., Yongin, Gyeonggi-Do (KR)

(72) Inventor: Eun Won Seo, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 182 days.

(21) Appl. No.: 14/469,409

(22) Filed: Aug. 26, 2014

(65) Prior Publication Data

US 2015/0109556 A1    Apr. 23, 2015

(30) Foreign Application Priority Data

Oct. 23, 2013    (KR) .................. 10-2013-0126515

(51) Int. Cl.
*G02F 1/1333* (2006.01)
*F21V 8/00* (2006.01)

(52) U.S. Cl.
CPC ..... *G02F 1/133308* (2013.01); *G02B 6/0081* (2013.01); *G02F 2001/133314* (2013.01)

(58) Field of Classification Search
CPC ... G02F 1/133308; G02F 2001/133314; G02F 2001/133317; G02F 2001/13332
See application file for complete search history.

(56) References Cited

U.S. PATENT DOCUMENTS

| | | | |
|---|---|---|---|
| 5,666,172 A * | 9/1997 | Ida .................. | G01D 11/28 349/58 |
| 5,742,233 A | 4/1998 | Hoffman et al. | |
| 5,835,139 A | 11/1998 | Yun et al. | |
| 5,926,237 A | 7/1999 | Yun et al. | |
| 6,002,457 A | 12/1999 | Yun et al. | |
| 6,020,942 A | 2/2000 | Yun et al. | |
| 6,315,616 B1 | 11/2001 | Hayashi | |
| 6,373,537 B2 | 4/2002 | Yun et al. | |
| 6,593,979 B1 * | 7/2003 | Ha .................. | G02F 1/133308 349/187 |
| 7,002,792 B2 | 2/2006 | Han et al. | |
| 7,006,168 B2 * | 2/2006 | Lee .................. | G02F 1/133308 349/58 |

(Continued)

FOREIGN PATENT DOCUMENTS

| | | |
|---|---|---|
| CN | 301004354 S | 9/2009 |
| CN | 301012594 S | 9/2009 |

(Continued)

*Primary Examiner* — Phu Vu
(74) *Attorney, Agent, or Firm* — Innovation Counsel LLP

(57) ABSTRACT

The inventive concepts provides a liquid crystal display having advantages of being capable of simplifying a manufacturing method thereof and minimizing damage to internal components therein by using a bottom chassis in which a flange unit and a receiver of a backlight unit are separated from each other. In accordance with the inventive concepts, the bottom chassis is formed in such a shape so as to be assembled and disassembled. Accordingly, it is possible to securely couple the flange unit to any necessary portions of the receiver, thereby reducing an effort and cost for mold development. Further, a gap between the receiver and the flange unit is formed to provide a predetermined degree of flexibility. Therefore, when the display device is assembled, deformation of the entire bottom chassis caused by deformation of the flange unit may be prevented.

20 Claims, 5 Drawing Sheets

(56) References Cited

U.S. PATENT DOCUMENTS

| | | | |
|---|---|---|---|
| 7,147,196 B2 * | 12/2006 | Knight | G09F 7/18 |
| | | | 248/476 |
| 7,312,837 B2 * | 12/2007 | Kim | G02F 1/133308 |
| | | | 349/12 |
| 7,369,189 B2 * | 5/2008 | Chieh | G02F 1/133308 |
| | | | 349/58 |
| 7,489,501 B2 | 2/2009 | Hong et al. | |
| 7,492,421 B1 | 2/2009 | Kim et al. | |
| 7,567,314 B2 * | 7/2009 | Lee | G02F 1/133308 |
| | | | 349/58 |
| D607,410 S | 1/2010 | Ikari | |
| D608,290 S | 1/2010 | Ikari | |
| D608,291 S | 1/2010 | Ikari | |
| 7,960,913 B2 * | 6/2011 | Yee | H04N 5/645 |
| | | | 313/512 |
| 8,111,351 B2 | 2/2012 | Cho et al. | |
| 8,350,979 B2 * | 1/2013 | Kim | H05B 33/04 |
| | | | 349/149 |
| 8,432,507 B2 | 4/2013 | Dai | |
| 8,786,801 B2 * | 7/2014 | Huang | G02F 1/133308 |
| | | | 349/58 |
| 2002/0080299 A1 | 6/2002 | Yun et al. | |
| 2003/0148647 A1 | 8/2003 | Hisamatsu et al. | |
| 2007/0121026 A1 * | 5/2007 | Chang | G02F 1/133308 |
| | | | 349/58 |
| 2008/0297041 A1 * | 12/2008 | Park | H05B 33/04 |
| | | | 313/504 |
| 2012/0293933 A1 | 11/2012 | Feng et al. | |
| 2013/0286319 A1 * | 10/2013 | Kuo | G02F 1/133308 |
| | | | 349/58 |
| 2014/0071377 A1 * | 3/2014 | Scardato | G02F 1/133308 |
| | | | 349/58 |

FOREIGN PATENT DOCUMENTS

| | | |
|---|---|---|
| CN | 301048610 S | 10/2009 |
| EP | 000970884-0001 | 9/2008 |
| EP | 000970884-0002 | 9/2008 |
| EP | 000970884-0003 | 9/2008 |
| JP | D1343284 | 11/2008 |
| JP | D1351217 | 2/2009 |
| JP | D1355630 | 4/2009 |
| JP | D1355631 | 4/2009 |
| JP | D1355632 | 4/2009 |
| JP | D1361179 | 6/2009 |
| KR | 10-0756857 | 9/2007 |
| KR | 30-0524300 | 3/2009 |
| KR | 30-0524301 | 3/2009 |
| KR | 30-0524302 | 3/2009 |
| KR | 30-0524300-0001 | 6/2009 |
| KR | 30-0524300-0002 | 12/2009 |
| TW | D128956 | 6/2009 |
| TW | D128957 | 6/2009 |
| TW | D130980 | 9/2009 |

\* cited by examiner

LIQUID CRYSTAL DISPLAY DEVICE

CROSS-REFERENCE TO RELATED APPLICATION

This application claims priority to and the benefit of Korean Patent Application No. 10-2013-0126515 filed in the Korean Intellectual Property Office on Oct. 23, 2013, the entire contents of which are incorporated herein by reference.

BACKGROUND (a) Field

Embodiments of inventive concepts relate to a liquid crystal display. More particularly, the inventive concepts relates to a liquid crystal display including a bottom chassis in which a flange unit and a receiver of a backlight unit are separable from each other.

(b) Description of the Related Art

With the rapid development of display technology, demand for display devices having improved performance has recently explosively increased.

The liquid crystal display, which has been in the spotlight in recent years, has advantages such as a reduced size, a light weight, and low power consumption such that it is drawing attention as a substitute which may overcome drawbacks of a cathode ray tube (CRT) of the related art. Currently, the liquid crystal display is mounted on almost all information processing equipment which requires the display device.

A conventional liquid crystal display is a non-self-emissive type of display device in which the alignment of liquid crystal molecules is changed by applying a voltage to specifically align liquid crystal molecules and display images using optical characteristic changes, which are caused by the change of the alignment of the liquid crystal molecules, such as birefringence, optical rotary power, dichroism, and optical scattering.

The liquid crystal display includes a liquid crystal panel and a backlight unit for supplying light thereto. A top chassis and a bottom chassis formed of stainless steel are respectively coupled to a top portion and a bottom portion of the liquid crystal display for coupling and securing.

Assembly and disassembly process become complex due to the various parts used. The top chassis may be bent during a fastening process of the top chassis and a drive integrated circuit (IC) chip may be damaged due to forced coupling.

When the top chassis is used as a ground in the liquid crystal display, if the connection between the top chassis and the liquid crystal panel may be defectively made, an electrostatic discharge (ESD) and electrostatic interference (EMI) may cause serious problems.

The above information disclosed in this Background section is only for enhancement of understanding of the background of the invention and therefore it may contain information that does not constitute prior art.

SUMMARY

The inventive concepts has been made in an effort to provide a liquid crystal display having advantages of being capable of simplifying a manufacturing method thereof and minimizing damage to internal components therein by using a bottom chassis in which a flange unit and a receiver of a backlight unit are separable from each other.

An exemplary embodiment of the inventive concepts provides a liquid crystal display including: a liquid crystal panel configured to display an image; a backlight unit configured to supply light to the liquid crystal panel; and a bottom chassis configured to accommodate the backlight unit, the bottom chassis including a bottom portion, a receiver extending substantially perpendicular to the bottom portion and including a first coupler disposed on a surface of the receiver, and a flange unit including a second coupler coupled to the first coupler.

The first coupler may be formed in a convex or concave shape, and the second coupler may be formed in a concave or convex shape corresponding to the coupler of the receiver.

The first coupler may be formed on an inner surface of a side surface of the receiver.

The first coupler may be formed on every inner surface of the receiver and may be formed along an entire inner surface.

The first coupler may be formed on at least one side surface of the receiver and may be formed along an entire inner surface.

The first coupler maybe divided into at least two parts and may be formed on a portion of a side surface of the receiver.

The flange unit may have a fastening hole configured to be coupled to the display device.

The first coupler may be formed on an entire surface of the receiver to which the flange unit is coupled.

The first coupler and the second coupler may be formed in a circularly concave or convex shape.

The first coupler and the second coupler may be formed in a triangularly concave or convex shape.

The first coupler and the second coupler may be formed in a quadrangularly concave or convex shape.

The receiver and the flange unit may provide flexibility when they are coupled to each other.

An exemplary embodiment of the inventive concepts provides a liquid crystal display including a display area configured to display an image and a bezel surrounding the display area, the liquid crystal display including a liquid crystal panel, a backlight unit configured to supply light to the liquid crystal panel, and a bottom chassis configured to accommodate the backlight unit, the bottom chassis including a bottom portion, a receiver extending substantially perpendicular to the bottom portion and including a first coupler disposed on an inner surface of the receiver, and a flange unit including a second coupler separably coupled to the first coupler and a fastening hole configured to couple with an external structure in a bezel area.

The first coupler may have a portion in which the second coupler is not coupled.

In accordance with the exemplary embodiment of the inventive concepts, the flange unit is manufactured in such a shape so as to be assembled and disassembled into the receiver. Accordingly, it is possible to securely couple the flange unit to any necessary portions of the receiver, thereby reducing an effort and cost for mold development. Further, a gap between the receiver and the flange unit is formed to provide a predetermined degree of flexibility. Therefore, when the display device is assembled, deformation of the entire bottom chassis caused by deformation of the flange unit may be prevented.

DETAILED DESCRIPTION OF THE EMBODIMENTS

Figure 1:
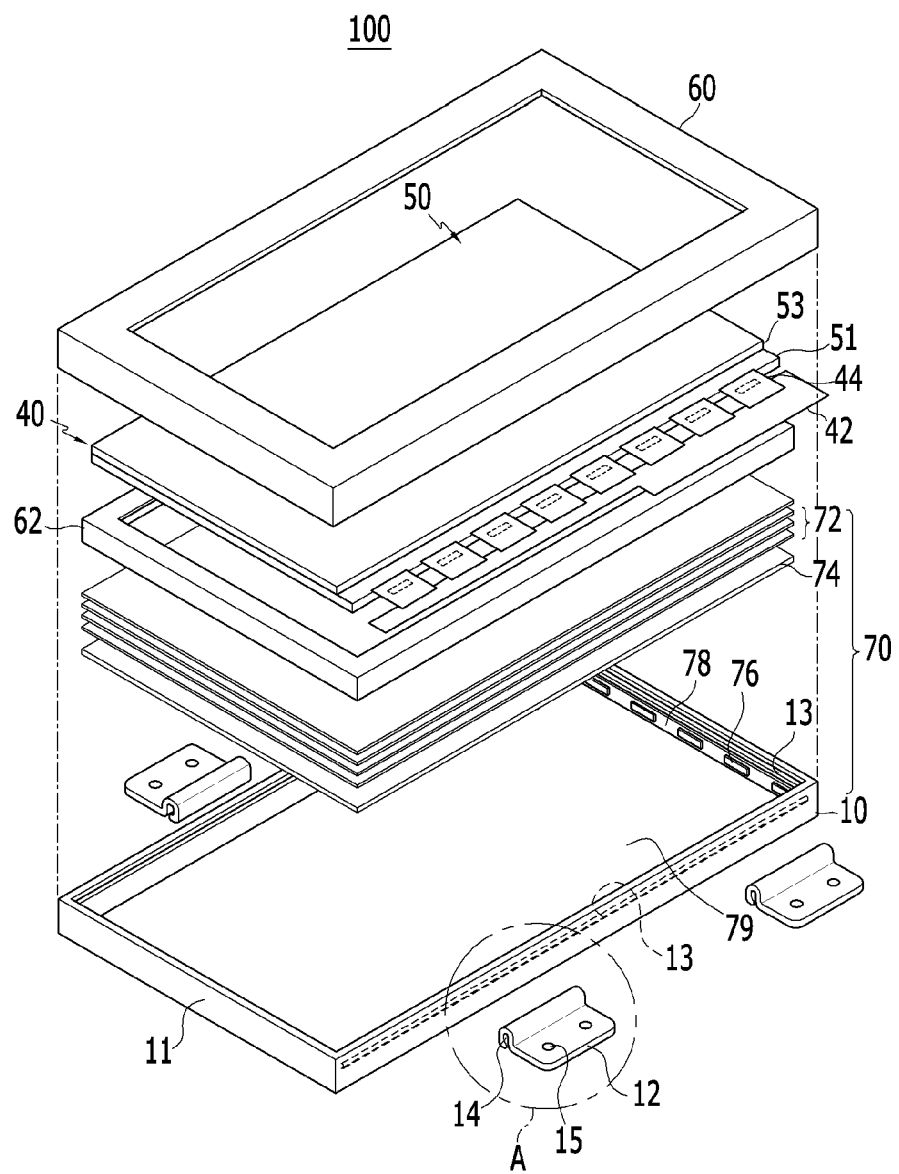
FIG. 1 is an exploded perspective view showing a liquid crystal display in accordance with an exemplary embodiment of the inventive concepts.

Embodiments of the inventive concepts will be described more fully hereinafter with reference to the accompanying drawings, in which exemplary embodiments of the inventive concepts are shown. As those skilled in the art would realize, the described embodiments may be modified in various different ways, all without departing from the spirit or scope of the inventive concepts.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be formed directly on the other element or be formed with intervening elements. In contrast, when an element is referred to as being "directly on" another element, there are no intervening elements present.

A liquid crystal display and a manufacturing method in accordance with an exemplary embodiment of the inventive concepts will now be described with reference to the accompanying drawings.

First, the liquid crystal display of the present exemplary embodiment will be described in detail with reference to FIG. 1.

FIG. 1 is an exploded perspective view showing the liquid crystal display 100 in accordance with the exemplary embodiment of the inventive concepts.

A backlight unit 70 includes a plurality of light emitting diodes (LEDs) 76 to supply light to a liquid crystal panel 50, and the LEDs 76 are arranged in parallel on a side surface of a bottom chassis 10 to emit a large amount of light.

A structure of the liquid crystal display 100 shown in FIG. 1 is only for describing the exemplary embodiment and the exemplary embodiment is not limited thereto. Accordingly, the liquid crystal displays may have different structures, and the LEDs may be arranged in various shapes. For example, the LEDs 76 may be disposed as a direct-lit type instead of an edge type as shown in FIG. 1. The LEDs may be disposed on any one side or on multiple sides of the light-guide plate.

Alternatively, various types of lamps such as cold cathode fluorescent lamps (CCFLs) may be used instead of the LEDs.

As shown in FIG. 1, the liquid crystal display 100 of the present exemplary embodiment includes a display area configured to display an image (not shown), a bezel surrounding the display area (not shown), the backlight unit 70 for supplying light and a liquid crystal display panel unit 40 for displaying images. In addition, a top chassis 60, a mold frame 62, and the bottom chassis 10 are coupled to the liquid crystal display 100 for securing and supporting the liquid crystal display 100. However, the top chassis 60 may be omitted as necessary.

The backlight unit 70 supplies light to the liquid crystal display panel unit 40 and guides the light to improve luminance. The liquid crystal display panel unit 40 located on the backlight unit 70 controls the light from the backlight unit 70 for displaying an image.

The liquid crystal display panel unit 40 includes the liquid crystal panel 50, a tape carrier package (TCP) 44, and a printed circuit board (PCB) 42. The liquid crystal panel 50 includes a TFT substrate 51 including a plurality of thin film transistors (TFTs), a color filter substrate 53 located above the TFT substrate 51, and liquid crystal (not shown) which is injected into a space between the color filter substrate 53 and the TFT substrate 51. A polarizer (not shown) is attached on a top surface of the color filter substrate 53 and a bottom surface of the TFT substrate 51 to linearly polarize visible rays supplied from the backlight unit 70.

The TFT substrate 51 is a transparent glass substrate in which the TFTs are formed in a matrix shape, and each of the TFTs includes a source terminal connected to a data line, a gate terminal connected to a gate line and a drain terminal connected to a pixel electrode made of a transparent conductive material such as indium tin oxide (ITO).

When an electrical signal is supplied from the PCB 42 into the gate line and the data line of the above-described liquid crystal display panel 50, the electric signal is inputted into the source terminal and the gate terminal of the corresponding TFT, and the TFT is turned on or turned off according to the input signals so that an electrical signal for pixel is outputted to the drain terminal.

The color filter substrate 53 is disposed on the TFT substrate 51. The color filter substrate 53 is a substrate on which RGB pixels, which are color pixels expressing predetermined colors by light passing therethrough, are formed by a thin film process. A common electrode formed of a transparent electrode such as ITO is provided on an entire surface of the substrate. When the TFT is turned on by applying power to the gate terminal and the source terminal thereof, an electric field is generated between the pixel electrode and the common electrode of the color filter substrate 53. An angle of the liquid crystal injected between the TFT substrate 51 and the color filter substrate 53 is changed by the electric field and light transmittance is changed according to the changed angle of the liquid crystal, thereby making it possible to display the desired images.

A driving signal and a timing signal are applied to the data line and the gate line of the TFT in order to control the angle of the liquid crystal and timings of the gate and data signals of the liquid crystal panel 50. To that end, the tape carrier package (TCP) 44 is provided in the liquid crystal panel 50 to determine application timing of the data driving signal and the gate driving signal.

The PCB 42 serving to receive an image signal from the outside of the liquid crystal panel 50 and to apply driving signals to the data line and the gate line is connected to the TCP 44 provided in the liquid crystal panel 50.

The PCB 42 serves to generate a data signal and a gate signal for driving the liquid crystal display 100, and a plurality of driving signals for facilitating the application of the data signal and the gate signal with appropriate timing to respectively apply the data signal and the gate signal to the gate line and the data line of the liquid crystal panel 50 through the TCP 44.

The backlight unit 70 for supplying uniform light to the liquid crystal display panel unit 40 is provided below the liquid crystal display panel unit 40.

The backlight unit 70 is accommodated in the bottom chassis 10 and includes the plurality of light emitting diodes (LEDs) 76 serving as backlights. The plurality of light emitting diodes (LEDs) 76 are arranged and secured at a side surface of the bottom chassis 10, and separated at a predetermined distance from each other. A reflective sheet 79 is accommodated adjacent to a bottom surface of the bottom chassis 10 to reflect light emitted from the LEDs 76 located at the side surface of the bottom chassis 10. An LED holder 78 securely holds back portions of the LEDs 76. An optical sheet 72 and a light-guide plate 74 is disposed on the reflective sheet to guide light emitted from the LEDs 76 to the liquid crystal display panel unit 40.

Although, the LEDs 76 are disposed at a side surface of the bottom chassis 10 as an exemplary embodiment, the position of the LEDs 76 may not be limited thereto and the LEDs may be disposed directly under the liquid crystal display panel unit 40 or the LEDs may be disposed at multiple side surfaces of the bottom chassis.

A signal converting PCB (not shown) and an inverter board (not shown) serving as a power-supply PCB are mounted on a back surface of the bottom chassis 10. The inverter board serves to change external power to a uniform voltage level and transfer it to the LEDs 76, and the signal converting PCB is connected to the aforementioned PCB 42 to convert an analog data signal into a digital data signal and transfer it to the liquid crystal panel 50.

The top chassis 60 is provided above the liquid crystal display panel unit 40 to fix the liquid crystal display panel unit 40 to the bottom chassis 10 while bending the TCP 44 to the outside of the mold frame 62. Although not shown in FIG. 1, a front case and a back case are respectively provided above the top chassis 60 and below the bottom chassis 10, and are coupled to each other to constitute the liquid crystal display 100. In this case, the top chassis 60 may be omitted.

The bottom chassis 10 includes a bottom portion and a receiver 11 of the backlight unit 70, the display device, and a flange unit 12 for facilitating the coupling. The receiver 11 extends substantially perpendicular to the bottom portion of the bottom chassis 10 and has rectangular shaped sidewalls when viewed from the top.

The receiver 11 and the flange unit 12 of the bottom chassis 10 are separately formed in such a shape so as to be coupled to each other. First coupler 13 and second coupler 14 are respectively formed in the receiver 11 and the flange unit 12 to securely couple the receiver 11 and the flange unit 12.

Hereinafter, a structure of the bottom chassis 10 of the liquid crystal display in accordance with the present exemplary embodiment will be described in detail with reference to FIG. 2.

Figure 2:
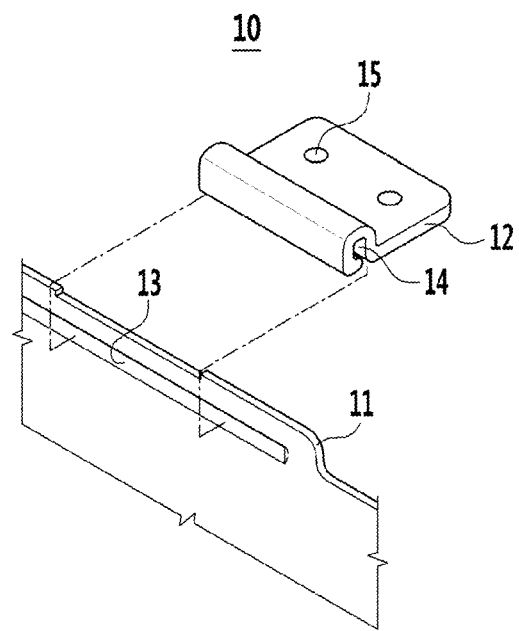
FIG. 2 is an enlarged view showing a portion "A" of a bottom chassis shown in FIG. 1.

FIG. 2 is an enlarged view showing a portion "A" of a bottom chassis shown in FIG. 1.

The bottom chassis 10 includes the receiver 11 of the backlight unit 70, the display device, and the flange unit 12 for facilitating the coupling.

The receiver 11 and the flange unit 12 of the bottom chassis 10 are separately formed in such a shape so as to be coupled to each other, and the first couplers 13 and the second coupler 14 are respectively formed in the receiver 11 and the flange unit 12 to securely couple the receiver 11 and the flange unit 12.

Specifically, in the receiver 11 of the bottom chassis 10, the first coupler 13 is formed on an inner surface of the receiver 11 to couple with the flange unit 12. The first coupler 13 may have a concave portion recessed from the inner surface of the receiver and/or a convex portion protruded from the inner surface of the receiver. The first coupler 13 may be formed on every inner surface of the receiver 11 and may be formed along an entire inner surface of the receiver 11 such that the flange unit 12 may be coupled to the receiver 11 at any necessary portions of the side surfaces of the receiver 11. The first coupler 13 may be formed on only necessary portions of the side surfaces thereof for coupling to the flange unit 12

Further, the first coupler 13 may be formed on all side surfaces of the receiver 11 or at least one side surface of the receiver 11 in the bottom chassis 10. As such, the flange unit 12 may be coupled to positions at which the first coupler 13 is formed.

The flange unit 12 of the bottom chassis 10 includes the second coupler 14 for coupling with the receiver 11, and a fastening hole 15 for coupling with an external structure formed in a bezel using a fastening device such as a screw or the like.

The second coupler 14 of the flange unit 12 has a convex or concave portion which is to be securely coupled to the first coupler on the side surface of the receiver 11. The convex or concave portion of the second coupler 14 is coupled to a concave or convex portion of the first coupler 13 of the receiver 11, thereby securing the receiver 11 and the flange unit 12 to each other.

The first couplers 13 of the receiver 11 and the second coupler 14 of the flange unit 12 of the bottom chassis 10 may have circular concave and/or convex portions, but are not limited thereto. Alternatively, the first couplers 13 and the second coupler 14 may have quadrangularly, triangularly, or polygonally concave and convex shapes.

The receiver 11 and the flange unit 12 are formed in such a shape so as to be assembled and disassembled. Accordingly, it is possible to securely couple the flange unit 12 to any necessary portions of the receiver 11 without regard to the location of coupling device which may be different according to the set maker, thereby reducing effort and cost for mold development.

Further, as the receiver 11 and the flange unit 12 are formed in such a shape so as to be assembled and disassembled, a gap between the receiver 11 and the flange unit 12 is formed to provide a predetermined degree of flexibility. Accordingly, when the display device is assembled, the flange unit 12 or the receiver 11 is not deformed, thereby preventing damage to the drive IC chip, caused by bending of top chassis 60 or forced coupling in a fastening step of the top chassis 60 during the assembly process.

Hereinafter, a structure of a bottom chassis in accordance with a modification of the present exemplary embodiment will be described with reference to FIG. 3.

Figure 3:
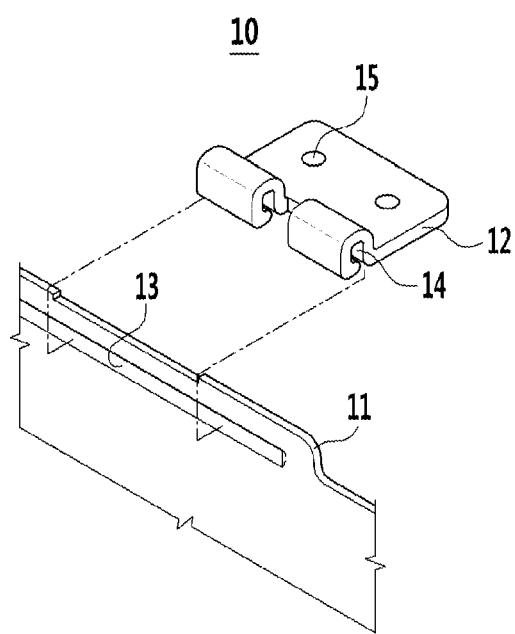
FIG. 3 shows a bottom chassis in accordance with a modification of the exemplary embodiment.

FIG. 3 shows the bottom chassis in accordance with the modification of the present exemplary embodiment.

The modification of the present exemplary embodiment shown with reference to FIG. 3 is substantially the same as the exemplary embodiment shown with reference to FIGS. 1 and 2 except for the second coupler 14 of the flange unit 12, and thus no repeated description will be provided.

As shown in FIG. 3, in the bottom chassis 10 in accordance with this modification, the second coupler 14 of the flange unit 12 is divided into two parts and is formed at opposite side surfaces of the flange unit 12.

FIG. 3 shows the second coupler 14 of the flange unit 12 which is divided into two parts, but the second coupler 14 is not limited thereto. Alternatively, the second coupler 14 may be divided into multiple parts.

Hereinafter, the bottom chassis 10 in which the receiver 11 is formed and the flange unit 12 are coupled to each other will be described in detail with reference to FIG. 4 to FIG. 6.

Figure 4:
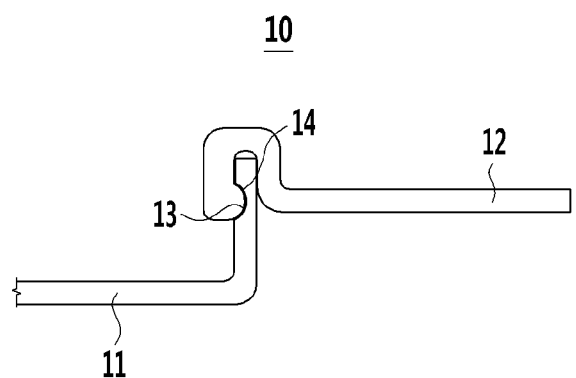
FIG. 4 is a cross-sectional view showing the bottom chassis in which a flange unit and a receiver of the liquid crystal display are coupled to each other in accordance with the present exemplary embodiment.
Figure 5:
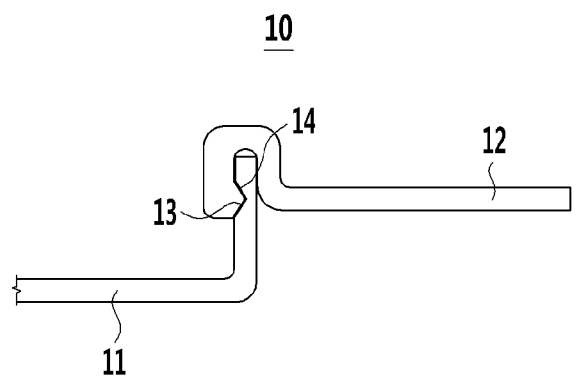
FIG. 5 is a cross-sectional view showing a bottom chassis in which a flange unit and a receiver of the liquid crystal display are coupled to each other in accordance with another modification of the present exemplary embodiment.
Figure 6:
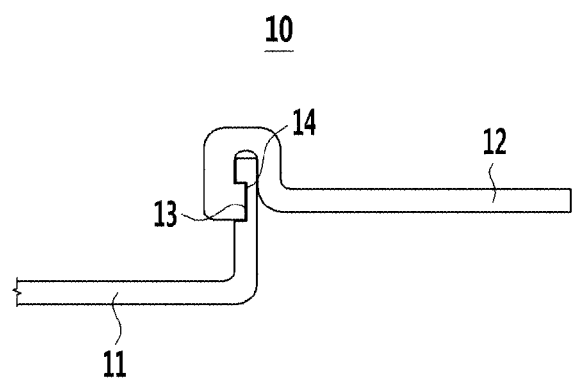
FIG. 6 is a cross-sectional view showing a bottom chassis in which a flange unit and a receiver of the liquid crystal display are coupled to each other in accordance with yet another modification of the present exemplary embodiment.

The present exemplary embodiment shown with reference to FIG. 4 is substantially the same as modifications of the present exemplary embodiment shown in FIG. 5 and FIG. 6 except the first coupler 13 on the receiver 11 and the second coupler 14 on the flange unit 12, and thus no repeated description will be provided.

Referring to FIG. 4, the first coupler 13 of the receiver 11 of the bottom chassis 10 is formed in a circularly concave shape, and the second coupler 14 of the flange unit 12 of the bottom chassis 10 is formed in a circularly convex shape. Accordingly, the receiver 11 and the flange unit 12 can be securely coupled to each other.

Referring to FIG. 5 and FIG. 6, the first coupler 13 of the receiver 11 of the bottom chassis 10 is formed in a triangularly or quadrangularly concave shape, and the second coupler 14 of the flange unit 12 of the bottom chassis 10 is formed in a triangularly or quadrangularly convex shape. Accordingly, the receiver 11 and the flange unit 12 can be securely coupled to each other.

The receiver 11 and the flange unit 12 are formed in such a shape so as to be assembled and disassembled each other. Accordingly, it is possible to securely couple the flange unit 12 to any necessary portions of the receiver 11, thereby reducing effort and cost for mold development. Further, a gap between the receiver 11 and the flange unit 12 is formed to provide a predetermined degree of flexibility. Accordingly, when the display device is assembled, deformation of the entire bottom chassis caused by deformation of the flange unit may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a liquid crystal panel configured to display an image;
   a backlight unit configured to supply light to the liquid crystal panel; and
   a bottom chassis configured to accommodate the backlight unit, the bottom chassis including a bottom portion, a receiver extending substantially perpendicular to the bottom portion and including a first coupler disposed on a surface of the receiver, and a flange unit including a second coupler coupled to the first coupler,
   wherein the flange unit extends in a first direction which is substantially perpendicular to the receiver and the bottom portion extends in a second direction which is substantially perpendicular to the receiver and opposite to the first direction.

2. The liquid crystal display of claim 1, wherein the first coupler is formed in a convex or concave shape, and
   the second coupler is formed in a concave or convex shape corresponding to the coupler of the receiver.

3. The liquid crystal display of claim 2, wherein the first coupler is formed on an inner surface of a side surface of the receiver.

4. The liquid crystal display of claim 3, wherein the first coupler is formed on every inner surface of the receiver and is formed along an entire inner surface.

5. The liquid crystal display of claim 3, wherein the first coupler is formed on at least one side surface of the receiver and is formed along an entire inner surface.

6. The liquid crystal display of claim 3, wherein the first coupler is divided into at least two parts and is formed on a portion of a side surface of the receiver.

7. The liquid crystal display of claim 2, wherein the flange unit has a fastening hole configured to be coupled to the display device.

8. The liquid crystal display of claim 7, wherein the first coupler is formed on an entire surface of the receiver to which the flange unit is coupled.

9. The liquid crystal display of claim 7, wherein the second coupler is divided into two parts.

10. The liquid crystal display of claim 2, wherein the first coupler and the second coupler are formed in a circularly concave or convex shape.

11. The liquid crystal display of claim 2, wherein the first coupler and the second coupler are formed in a triangularly concave or convex shape.

12. The liquid crystal display of claim 2, wherein the first coupler and the second coupler are formed in a quadrangularly concave or convex shape.

13. The liquid crystal display of claim 1, wherein the receiver and the flange unit provide flexibility when they are coupled to each other.

14. A liquid crystal display including a display area configured to display an image and a bezel surrounding the display area, the liquid crystal display comprising:
   a liquid crystal panel;
   a backlight unit configured to supply light to the liquid crystal panel; and
   a bottom chassis configured to accommodate the backlight unit, the bottom chassis including a bottom portion, a receiver extending substantially perpendicular to the bottom portion and including a first coupler disposed on an inner surface of the receiver, and a flange unit including a second coupler separably coupled to the first coupler and a fastening hole configured to couple with an external structure in a bezel area,
   wherein the flange unit extends in a first direction which is substantially perpendicular to the receiver and the bottom portion extends in a second direction which is substantially perpendicular to the receiver and opposite to the first direction.

15. The liquid crystal display of claim 14, wherein the first coupler has a portion in which the second coupler is not coupled.

16. The liquid crystal display of claim 15, wherein the first coupler is formed on every inner surface of the receiver and is formed along an entire inner surface.

17. The liquid crystal display of claim 16, wherein the first coupler and the second coupler are formed in a circularly concave or convex shape.

18. The liquid crystal display of claim 16, wherein the first coupler and the second coupler are formed in a triangularly concave or convex shape.

19. The liquid crystal display of claim 16, wherein the first coupler and the second coupler are formed in a quadrangularly concave or convex shape.

20. The liquid crystal display of claim 15, wherein the first coupler is formed on at least one side surface of the receiver and is formed along an entire inner surface.

* * * * *